April 15, 1930.  E. BRILLIÉ  1,754,602
STEAM ENGINE PARTICULARLY APPLICABLE TO COMBINED
INTERNAL COMBUSTION AND STEAM ENGINES
Filed June 24, 1927   2 Sheets-Sheet 1

E. Brillié
INVENTOR

By: Marks & Clerk
Attys.

April 15, 1930. E. BRILLIÉ 1,754,602
STEAM ENGINE PARTICULARLY APPLICABLE TO COMBINED
INTERNAL COMBUSTION AND STEAM ENGINES
Filed June 24, 1927 2 Sheets-Sheet 2

E. Brillié
INVENTOR

By: Marks & Clark
Attys.

Patented Apr. 15, 1930

1,754,602

UNITED STATES PATENT OFFICE

EUGÈNE BRILLIÉ, OF PARIS, FRANCE

STEAM ENGINE PARTICULARLY APPLICABLE TO COMBINED INTERNAL-COMBUSTION AND STEAM ENGINES

Application filed June 24, 1927, Serial No. 201,191, and in France July 2, 1926.

The present invention relates to improvements in equiflow steam engines and is more particularly applicable to combined internal combustion and steam engines in which the explosion gases act against one face of the piston and the steam against the other face, the piston rod on the steam side being provided with passages leading the steam into a hollow space within the piston head in such manner as to effect the cooling of the surfaces heated by the action of the explosion gases.

On the accompanying drawing: Fig. 1 shows a known arrangement of this type. The piston B is displaced in the cylinder A. One of the faces (that on the left) $B^e$ of the piston is subjected to the action of the hot explosion gases (the engine is assumed to operate on the two-stroke cycle with admission at D and exhaust at E). The steam acts on the other face of the piston $B^f$. It is admitted from the distributing contrivance by a port $e$, and passes in succession through passages $c$ formed in a swell G of the piston rod C and a space $b$ provided within the hollow head of the piston, in order to enter the increasing space $a$ of the cylinder. The space $b$ is constituted by the interstices between fins H, provided better to ensure the cooling of the metal.

The above described flow through the hollow $b$ ceases after traverse of a portion $l$ of the stroke, when the swell G issues from a sleeve S, since instant direct communication is established between the spaces $a$ and $d$. The duration of such flow is therefore limited to a short period which approximately corresponds with the admission. Finally the swell G constitutes a considerable mass subjected to alternating opposite forces.

The invention consists in a combination of the so-called "equiflow steam" cycle and a hollow in a long extension of the piston rod for the purpose of prolonging the circulation of steam in the piston in order to insure the most effective cooling of the piston and at the same time a better superheating of the steam destined for effecting a better output.

On the accompanying drawing:—

Figure 1:
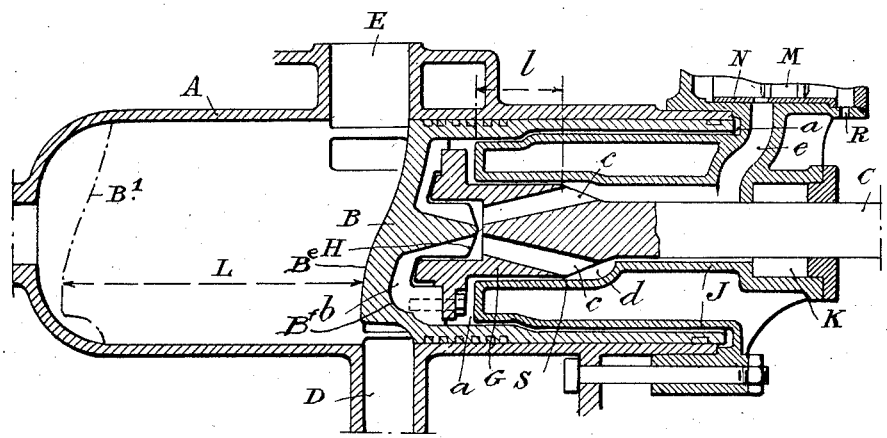
Figure 2:
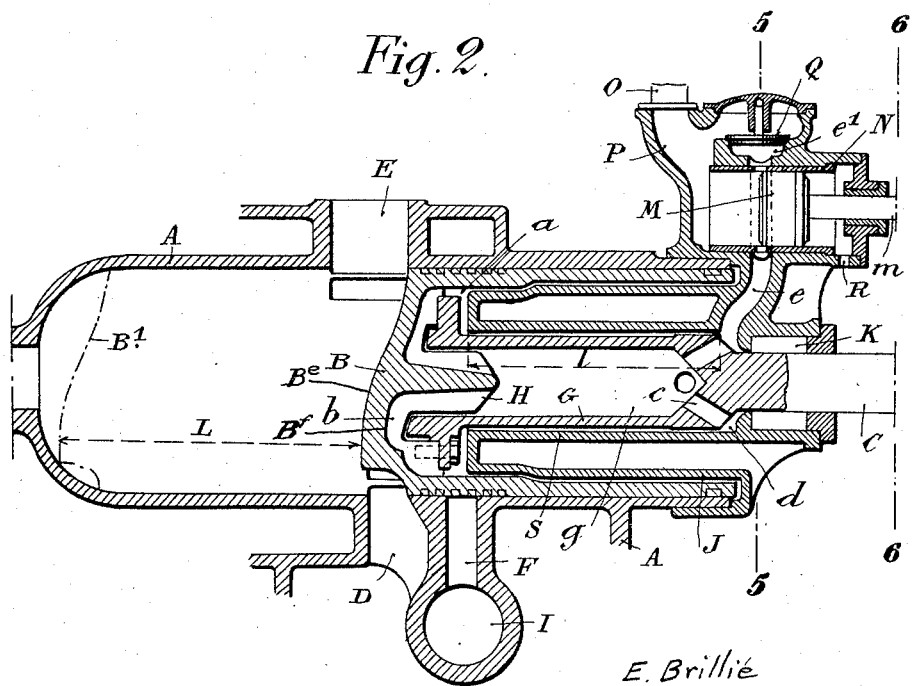
Fig. 2 illustrates the arrangement according to the invention, the piston being at the end of its stroke on the "steam" side.
Figure 3:
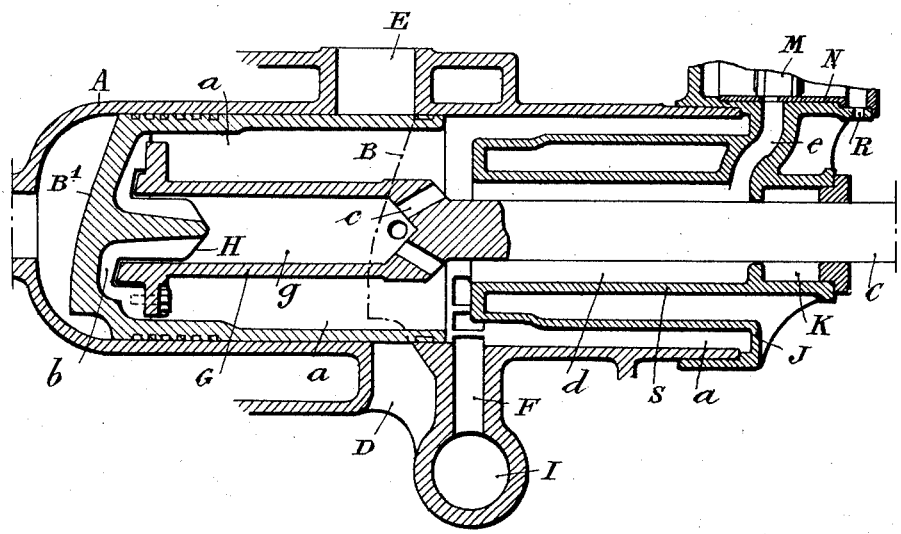
Fig. 3 shows the piston at the end of its stroke on the "internal combustion" side.
Figure 4:
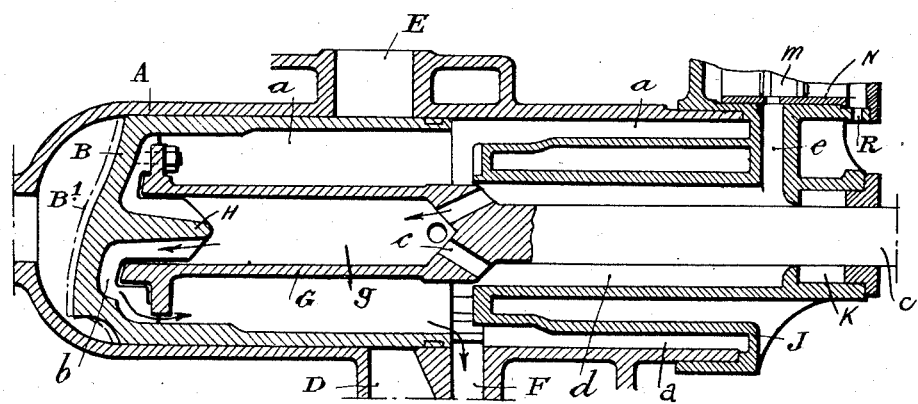
Fig. 4 shows a modification.

(The letters of reference used in connection with Fig. 1 apply also to Figs. 2 to 4.)

The piston B, in the position $B^1$ of Fig. 3, uncovers ports F by which the steam exhausts, the slide valve M serving only for admission.

During the return stroke from $B^1$ to B, once the port F has been closed by the piston, a prolonged period of compression occurs, requiring considerable dead spaces in order not to exceed, towards the end of the stroke, the admission pressure, the dead space being the varying play or clearance between the piston and cylinder bottom and between the slide valve and cylinder. These dead spaces are distributed as follows:—

Instead of the passages $c$ debouching directly (as in Fig. 1) into the hollow piston head $b$, they debouch into a space $g$ formed in the swell G of the piston rod C, the swell extending throughout the whole of the space available between the head of the piston and the stuffing box K (when in the position B Fig. 2), and telescoping throughout its entire length with the minimum of clearance, in a sleeve S fast with the cylinder head J.

The dead space necessary for operating on the "equiflow" system will therefore be principally constituted by the hollow $g$ and the passage $e$ to which, together with its ramifications ($e^1$ for example) are given the appropriate capacity.

The action is as follows:—

Starting from the position B (Fig. 2), the period of admission, during for example 20 to 40% of the stroke, the steam, by the passages or spaces $e, d, c, g$ penetrates by the hollow $b$ of the piston head into the increasing space $a$. Then follows the period of expansion; by virtue of the length of the telescoping of the swell G within the sleeve S, the steam confined in the spaces $e, d, c, g$ continues to expand and to pass into the space $a$ by passing through the hollow $b$ of the piston head, in consequence cooling the piston head during the portion *l* of the stroke considerably increased as compared with the hitherto known arrangement, until the instant that the swell G issues completely from the space *d*, i. e. from the sleeve S.

During the reverse stroke, as soon as the swell G enters the space *d*, the steam compressed in the space *a* traverses by the hollow *b* of the piston head, the spaces *g*, *c*, *d*, *e*, until a new admission phase commences. The efficacy of cooling is thus very considerably increased, more especially as at certain instants the steam passes expanded, i. e. at a temperature less than that of admission.

It is easy to appreciate that if the stuffing box K is displaced a certain amount to the right (Fig. 4), the swell G can be lengthened and the period of flow corresponding to the portion *l* of the stroke can be rendered equal to the stroke L of the piston. There will then be a constant flow in the hollow of the piston head during the entire cycle: admission, expansion, exhaust, compression, particularly at the instant of uncovering of the port F (position shown in Fig. 4), the expanded steam contained in the spaces *e*, *d*, *c*, *g* passing in puffs in the direction of the arrows in the passage *b*, effecting cooling more effectively as it is at a low temperature.

With a locomotive or any other engine adapted to run idly, arrangements must be applied for suppressing during the running without steam the effects of expansion and compression in the cylinders.

In the present case, with the equiflow system of distribution, a very simple arrangement of by-pass may be made use of, avoiding the auxiliary piping applied in the case of ordinary distribution. The by-pass valve Q is provided between the passage *e* (extended at $e^1$) and the steam chest P opening into the latter.

The steam is admitted through the pipe O into the steam chest P; it is distributed through the slide valve M which opens the port *e* for the admission of steam in the cylinder. The valve M operated by the rod *m* is displaced in its sleeve N; its rear face communicates with the atmosphere through the orifice R. The port *e* corresponds with the space $e^1$ below a valve which opens into the steam chest P for suppressing counter-pressure during idle running without steam.

The engine being multicylindered, a cylinder $T^1$ is always at admission and at the same time another cylinder $T^2$ is at compression, assuming that the two cranks are at an angle of 180°.

During the compression period, the residual steam in the cylinder $T^2$ is forced back by the piston in the steam chest P, the valve Q being raised. As the steam chests of the different cylinders intercommunicate through the inflow of steam Q, this steam forced back from the cylinder $T^2$ is received in the cylinder $T^1$ in the admission period. Consequently, there is no compression effect or expansion effect in the cylinders.

I claim:

In a combined internal combustion and steam engine of the class described, a cylinder, a piston sliding in said cylinder, a piston rod having a hollow cylindrical portion secured to said piston and extending the length thereof, said piston rod having also a reduced portion, a sleeve mounted in the cylinder and surrounding the hollow piston rod, said sleeve having an internal diameter slightly exceeding the diameter of the hollow rod, a stuffing box surrounding the reduced portion of the rod, a steam inlet communicating with the space between said sleeve and said reduced portion, said hollow portion having an aperture adjacent said reduced portion and communicating with said space, and a steam outlet in said cylinder communicating with said hollow portion.

In testimony whereof I affix my signature.

EUGÈNE BRILLIÉ.